INVENTOR.
EVERETT O. STARRATT

United States Patent Office 3,452,946
Patented July 1, 1969

3,452,946
REEL
Everett O. Starratt, Cumberland, R.I., assignor to Wanskuck Company, a corporation of Rhode Island
Filed Jan. 11, 1968, Ser. No. 697,222
Int. Cl. B65h 75/14
U.S. Cl. 242—118.8          1 Claim

ABSTRACT OF THE DISCLOSURE

A reel construction in which the head is provided with machined portions to insure concentricity of the barrel and in which the head is provided with a special reinforced construction to prevent warping thereof.

Background of the invention

Particularly in the wire drawing industry, there is an increased tendency towards operating the winding apparatus at higher speeds. Operation of reels at higher speeds places great strains upon the reels and requires that they maintain their concentricity, accuracy and balance. It has been common in the past to press form the heads of spools and then to rely upon the skill of the worker to weld the barrel concentrically with all of the structures including the center tube, which operation is extremely time consuming as it requires a great amount of setup time for the operator.

Summary of the invention

The reel has a head with a central opening and concentric with this central opening is a recess which receives the end of the barrel. Received through the central opening is a center tube. The head is provided with a reinforcing plate with radially extending ribs formed therein which plate is welded to the head and to the center tube which extends beyond the outer face of the head. To resist radially inward deformation of the barrel, stiffening rings may be welded to the inner surface of the barrel and are of a dimension where they contact the center tube.

Description of the preferred embodiment

Figure 1:
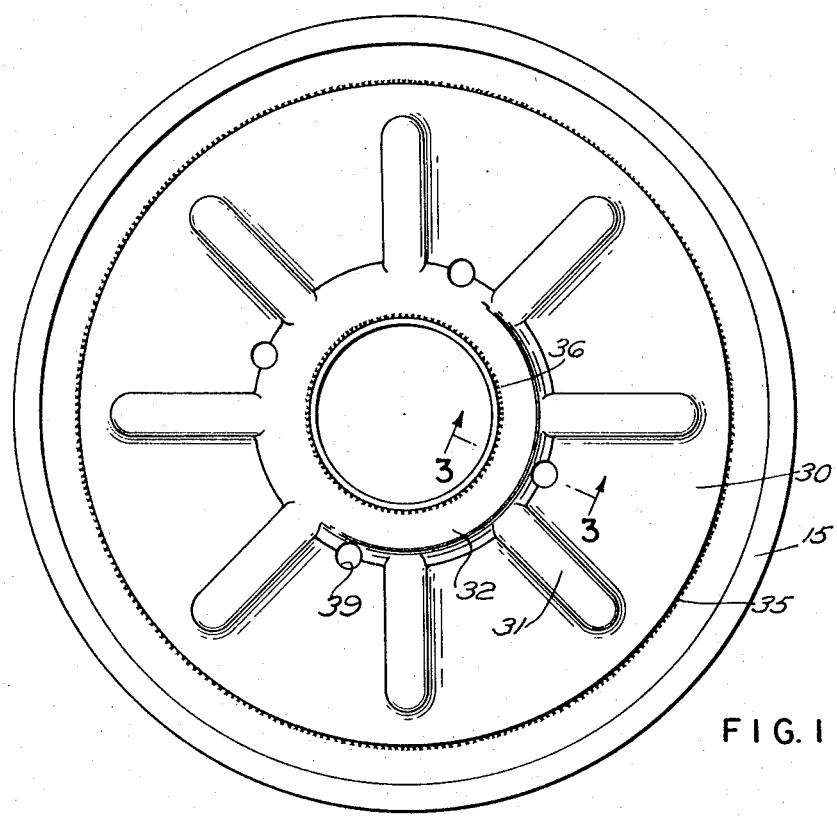
FIG. 1 is a plan view of the reel showing the outer end of the head.
Figure 2:
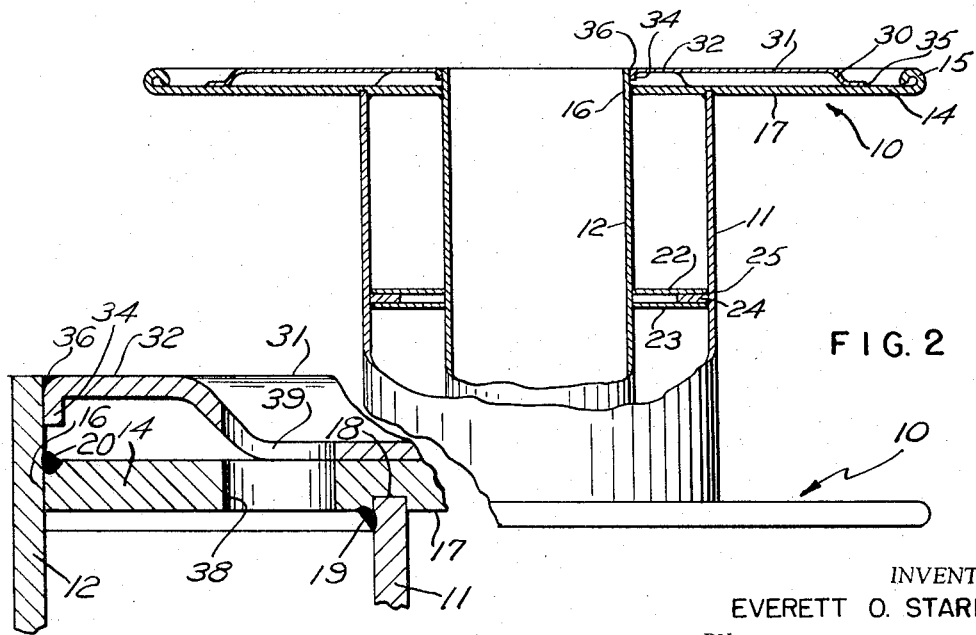
FIG. 2 is a fragmentary elevational view partly in section showing the parts of the head, the barrel and the center tube in assembled relationship.
Figure 3:
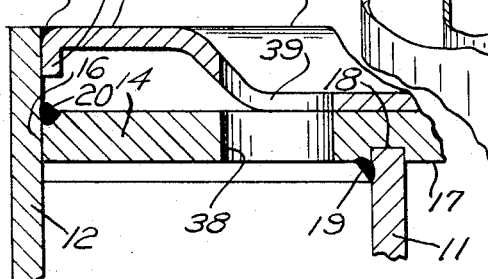
FIG. 3 is a fragmental sectional view on an enlarged scale showing the manner of assembling the center tube, the barrel and the head.

The reel of this invention is composed of two heads generally designated 10 between which there is a barrel 11 and a center tube 12. The heads 10 are formed from two pieces of material, there being a first piece of relatively thick high strength material designated 14 which is circular in plan and which has a curled edge 15 and a central aperture 16 which receives the center tube 12. An the inner face 17 of the head 14 a recess 18 is formed as by machining and is preferably machined at the same time that the aperture 16 is machined so that concentricity may be attained. If these parts are not machined, then they should be formed at the same time, the requirement being that the recess 18 which is a circumferential recess formed in the face 17 will be concentric with the aperture 16. A barrel 11 is formed so as to have a diameter equal to the diameter of the recess 18. In this fashion the barrel will fit into the recess 18 and without the use of any external tools or dies will be concentric with the center aperture 16 of the head. As seen in greater detail in FIG. 3, the barrel 11 is welded by a continuous weld 19 to the head 14 and similarly the center tube 12 is continuously welded to the head 14 as by weld indicated at 20 which is also continuous. Strengthening between the barrel 11 and the center tube 12 may be provided with a number of spaced rings such as 22, 23 which have spacing blocks 24 therebetween, the whole structure thereof being welded to the inner surface of the barrel 11 as at 25.

To provide reinforcing of the head 10, a plate 30 is provided, which plate has a number of radially extended ribs 31 that emanate from a central raised ring portion designated 32. On the radially inward portion of the reinforcing plate 30 an aperture is formed by an inwardly turned end 34 that is deflected radially inward as related to the entire reel structure to provide an aperture to receive the center tube 12. The outer circumference of the reinforcing plate 30 is welded to the head 14 as at 35 and the inwardly turned end 34 is welded to the center tube 16 as at 36. As desired, drive holes 38, 39 pass through the plate 30 and the head 14. This construction provides a head which withstands both horizontal and axial stresses as well as radial stresses that might be exerted on the beaded portion 15, and the entire reel by virtue of the concentricity that may be easily maintained is always in balance.

In assembling the reel the barrel 11 is positioned in the recess 18 in the heads and welded as at 19, then the center tube is positioned in the opening 16 and welded as at 20. The plate 30 is then positioned over the end of the center tube and welded as at 35 and 36.

I claim:
1. A reel comprising a pair of heads interconnected by a barrel and a coaxial center tube, each head having an inner face and an outer face, each face extending in substantially parallel planes, a first central aperture in each head, a circumferential channel shape recess located in the inner face of each head, said aperture and said recess being coaxial, said barrel being received in said recess and secured therein, a reinforcing plate secured to the outer face of each head, each said reinforcing plate having a plurality of radial ribs and a second central aperture therein, said center tube being received in said first and second central apertures, said center tube being secured to each of said heads and reinforcing plates, and a plurality of discs secured to the inner surface of said barrel and extending between the inner surface of said barrel and the outer surface of said center tube, said discs being in adjacency with a spacer block between and in contact therewith.

References Cited

UNITED STATES PATENTS

| | | | |
|---|---|---|---|
| 536,663 | 4/1895 | Stevenson | 242—118.8 |
| 1,672,167 | 6/1928 | Mossberg | 242—118.8 |
| 1,811,517 | 6/1931 | Mossberg | 242—77.3 X |
| 2,316,028 | 4/1943 | Tucker | 242—118.8 |
| 2,370,066 | 2/1945 | Olson | 242—77.4 |
| 2,635,830 | 4/1953 | Tucker | 242—118.8 |
| 2,753,622 | 7/1956 | Bieber et al. | 242—77.3 X |

GEORGE F. MAUTZ, *Primary Examiner.*